United States Patent
Hirano et al.

(10) Patent No.: US 10,063,348 B2
(45) Date of Patent: Aug. 28, 2018

(54) RETRANSMISSION DATA PROCESSING DEVICE, RETRANSMISSION DATA COMMUNICATION DEVICE, RETRANSMISSION DATA COMMUNICATION SYSTEM, RETRANSMISSION DATA PROCESSING METHOD, RETRANSMISSION DATA COMMUNICATION METHOD, AND NON-TRANSITORY COMPUTER READABLE MEDIUM FOR DETECTING ABNORMALITY BY COMPARING RETRANSMISSION DATA TO TRANSMISSION DATA

(71) Applicant: MITSUBISHI ELECTRIC CORPORATION, Tokyo (JP)

(72) Inventors: Takato Hirano, Tokyo (JP); Nori Matsuda, Tokyo (JP); Kazuhiro Kusunoki, Tokyo (JP); Akihiro Miura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 14/909,059

(22) PCT Filed: Jul. 30, 2013

(86) PCT No.: PCT/JP2013/070647
§ 371 (c)(1),
(2) Date: Jan. 29, 2016

(87) PCT Pub. No.: WO2015/015572
PCT Pub. Date: Feb. 5, 2015

(65) Prior Publication Data
US 2016/0191210 A1    Jun. 30, 2016

(51) Int. Cl.
*H04L 1/08*     (2006.01)
*G06F 11/14*   (2006.01)
(Continued)

(52) U.S. Cl.
CPC .............. *H04L 1/08* (2013.01); *G06F 11/14* (2013.01); *G06F 11/1443* (2013.01);
(Continued)

(58) Field of Classification Search
CPC ..... H04L 1/08; H04L 1/12; H04L 1/16; H04L 1/18; H04L 1/1867; H04L 1/189;
(Continued)

(56) References Cited

U.S. PATENT DOCUMENTS 7,343,514 B2   3/2008   Yamato et al.
8,438,445 B2   5/2013   Chen
(Continued)

FOREIGN PATENT DOCUMENTS

CN   101019360 A   8/2007
JP   11-231927 A   8/1999
(Continued)

*Primary Examiner* — Albert Decady
*Assistant Examiner* — Christian Dorman
(74) *Attorney, Agent, or Firm* — Birch, Stewart, Kolasch & Birch, LLP

(57) ABSTRACT

A data generation device 101 transmits communication data bound for a data receiving device 105 from a transmission unit, and a monitoring device 103 receives the communication data. The monitoring device 103 requests retransmission of the communication data to the data generation device 101, and the data generation device 101 retransmits the communication data from a retransmission unit being different from the transmission unit. The monitoring device 103 receives retransmission data retransmitted from the retransmission unit, compares the communication data with the retransmission data. If the communication data and the
(Continued)

retransmission data are identical, the monitoring device 103 transmits the communication data to the data receiving device 105. If the communication data and the retransmission data are not identical, the monitoring device 103 transmits a message which notifies that the communication data and the retransmission data are not identical to the data generation device 101.

13 Claims, 7 Drawing Sheets

(51) Int. Cl.
*G06F 13/00* (2006.01)
*H04L 29/06* (2006.01)
*H04L 1/16* (2006.01)
*H04L 1/18* (2006.01)

(52) U.S. Cl.
CPC ............... *G06F 13/00* (2013.01); *H04L 1/16* (2013.01); *H04L 1/189* (2013.01); *H04L 63/08* (2013.01); *H04L 63/12* (2013.01); *H04L 63/123* (2013.01); *H04L 63/14* (2013.01)

(58) Field of Classification Search
CPC ......... H04L 63/00; H04L 63/08; H04L 63/12; H04L 63/123; H04L 63/14; G06F 11/14; G06F 11/1443; G06F 11/16; G06F 11/1608; G06F 11/1616; G06F 11/1625; G06F 11/1629; G06F 11/1641; G06F 13/00
See application file for complete search history.

(56) References Cited

U.S. PATENT DOCUMENTS

| | | |
|---|---|---|
| 2004/0044649 A1 | 3/2004 | Yamato et al. |
| 2004/0054796 A1 | 3/2004 | Kikuchi et al. |
| 2006/0161641 A1 | 7/2006 | Sekiguchi et al. |
| 2007/0255993 A1 | 11/2007 | Yap et al. |
| 2008/0002644 A1 | 1/2008 | Matsumoto et al. |
| 2008/0100304 A1 | 5/2008 | Huang et al. |
| 2008/0222478 A1* | 9/2008 | Tamaki ..................... H04L 1/18 714/749 |
| 2009/0328185 A1 | 12/2009 | Berg et al. |
| 2010/0085062 A1 | 4/2010 | Huang et al. |
| 2012/0230257 A1 | 9/2012 | Yap et al. |
| 2012/0263250 A1 | 10/2012 | Yap et al. |
| 2012/0287775 A1 | 11/2012 | Yap et al. |
| 2013/0166982 A1* | 6/2013 | Zheng ................... H04L 1/1877 714/748 |
| 2013/0227650 A1 | 8/2013 | Miyake |
| 2014/0126468 A1* | 5/2014 | Filgueiras ............. H04L 1/1845 370/328 |
| 2014/0362679 A1 | 12/2014 | Yap et al. |
| 2014/0362945 A1 | 12/2014 | Yap et al. |
| 2014/0376387 A1* | 12/2014 | Shin ...................... H04L 1/0003 370/245 |
| 2015/0304072 A1* | 10/2015 | Yap .................. H03M 13/6306 370/328 |

FOREIGN PATENT DOCUMENTS

| | | |
|---|---|---|
| JP | 2001-36586 A | 2/2001 |
| JP | 2001-43103 A | 2/2001 |
| JP | 2002-77115 A | 3/2002 |
| JP | 2004-86721 A | 3/2004 |
| JP | 2004-94555 A | 3/2004 |
| JP | 2005-228230 A | 8/2005 |
| JP | 2006-157144 A | 8/2005 |
| JP | 2006-201970 A | 8/2006 |
| JP | 2008-11201 A | 7/2007 |
| JP | 2008-519374 A | 6/2008 |
| JP | 2009-182728 A | 8/2009 |
| JP | 2010-124163 A | 6/2010 |
| JP | 2011-118608 A | 6/2011 |
| JP | 4-309153 A | 5/2012 |
| JP | 2012-104049 A | 5/2012 |
| TW | 200726115 A | 7/2007 |
| TW | 290829673 A | 5/2008 |

\* cited by examiner

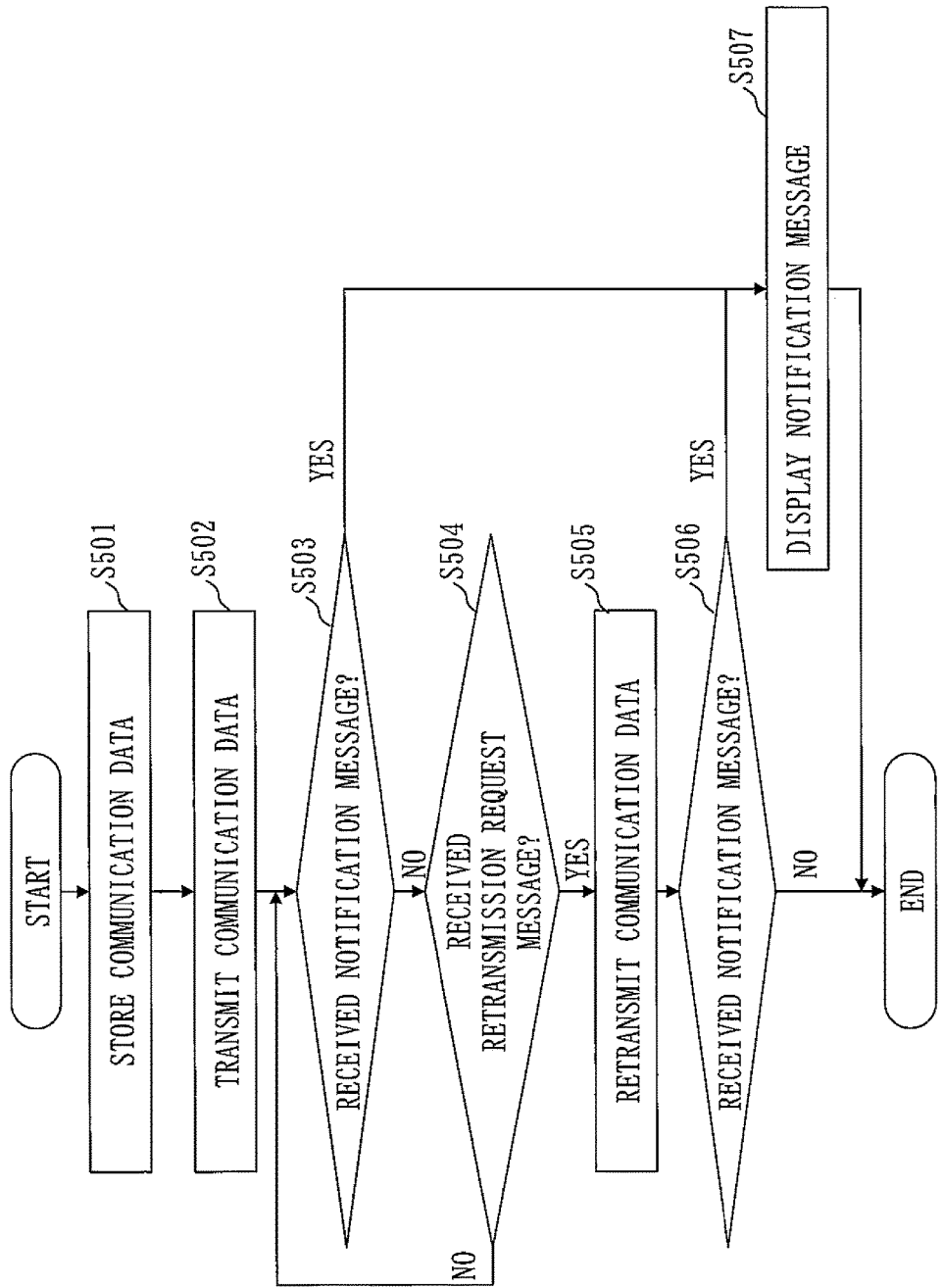

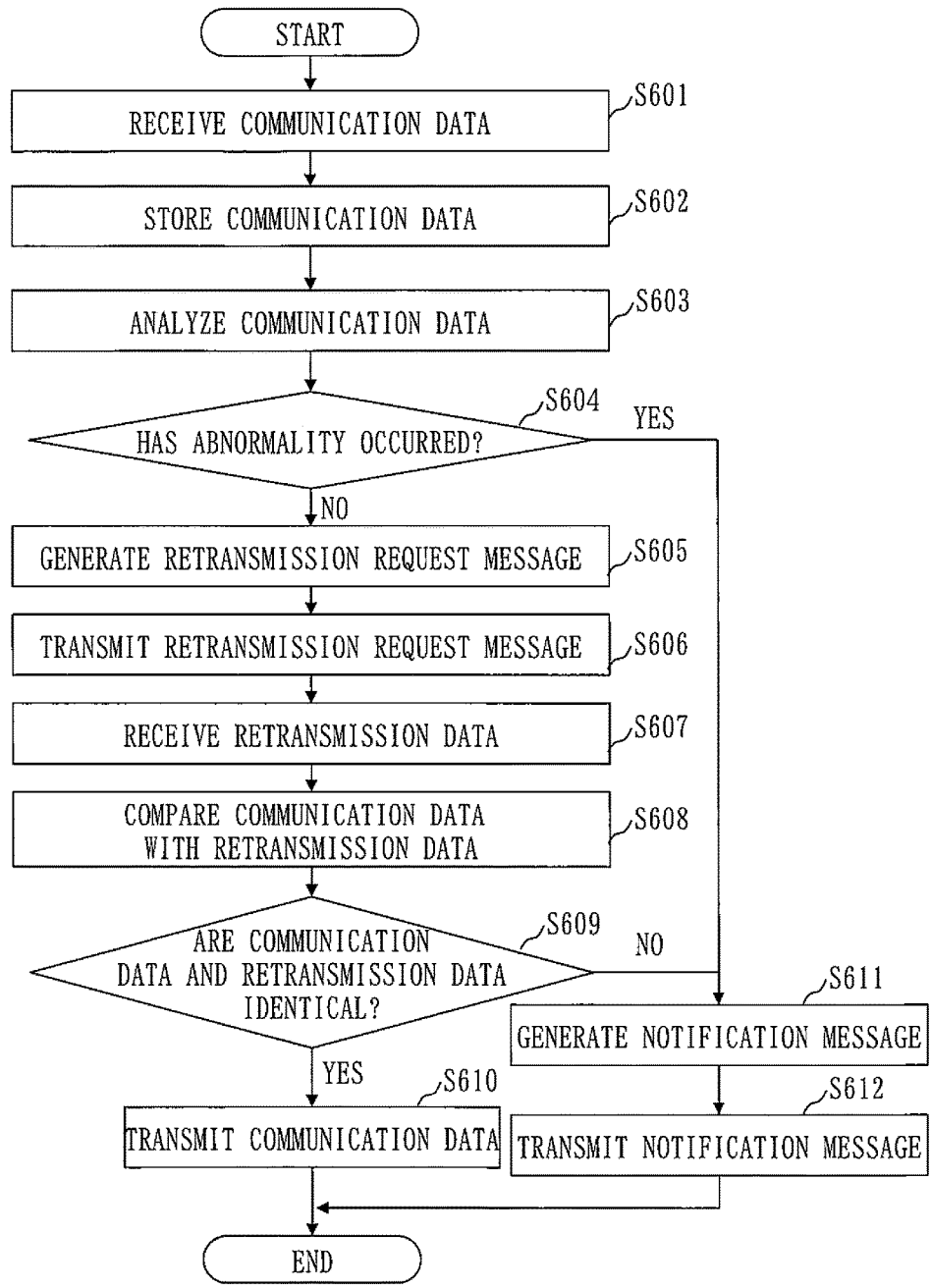

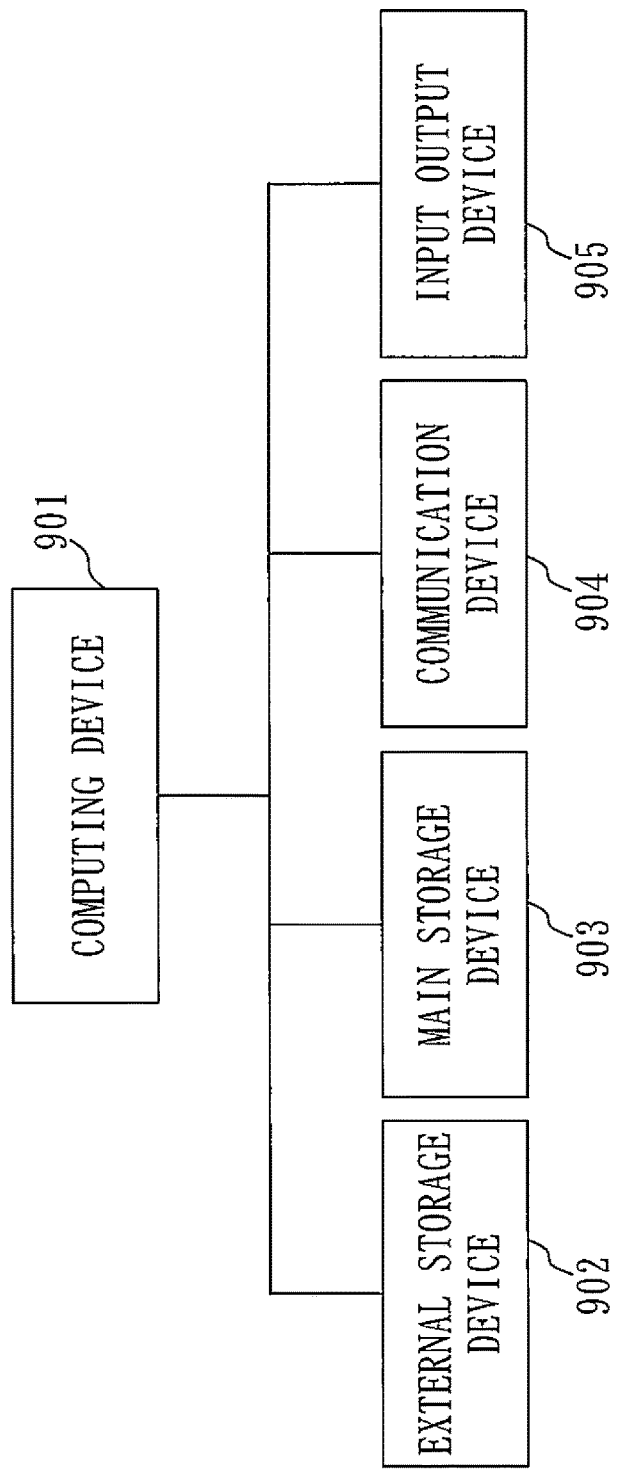

RETRANSMISSION DATA PROCESSING DEVICE, RETRANSMISSION DATA COMMUNICATION DEVICE, RETRANSMISSION DATA COMMUNICATION SYSTEM, RETRANSMISSION DATA PROCESSING METHOD, RETRANSMISSION DATA COMMUNICATION METHOD, AND NON-TRANSITORY COMPUTER READABLE MEDIUM FOR DETECTING ABNORMALITY BY COMPARING RETRANSMISSION DATA TO TRANSMISSION DATA

TECHNICAL FIELD

The present invention relates to technology that detects an abnormality on a computer.

BACKGROUND ART

There are various software installed on an OS (Operating System) in a PC (Personal Computer).

Software installed on the PC may include a function that rewrites a part of data on the OS at installation in an attempt to pursue convenience and efficiency, in addition to a function that performs processing using various data provided by the OS according to objectives.

When a part of the data on the OS is rewritten by software, it is generally difficult for other software to automatically recognize and detect that the part of the data is rewritten.

Therefore, there is a possibility of an unexpected error occurring when the other software attempts to perform processing after the data on the OS is rewritten.

There is a case where software may erroneously rewrite data of other software.

In this case as well, there is a possibility of an unexpected error occurring in the software the data of which is rewritten.

As described above, since software installed may interfere with each other and cause harmful effects on each other, technology capable of detecting abnormalities in software on a PC or in a PC itself is in demand.

As abnormality detection technology described above, there is a method of preparing data in advance and detecting an abnormality in a device based on the data prepared in advance.

For example, Patent Literature 1 discloses a method described below.

A test device possesses a pair or a plurality of pairs of input data for (software in) a determination target device about which a determination is made whether or not abnormal operation is conducted, and ideal (i.e. expected) output data from the determination target device.

The test device determines whether or not an abnormality has occurred in (the software of) the determination target device by inputting the input data the test device possesses to the determination target device and testing whether or not the ideal output data returns from the determination target device.

CITATION LIST

Patent Literature

Patent Literature 1: JP2009-182728 A

SUMMARY OF INVENTION

Technical Problem

With such a method disclosed in Patent Literature 1, however, it is possible to carry out a test only with a pair of the input data and the output data that has been prepared in advance.

Therefore, there is a problem in that the determination target device cannot always be assured to operate normally in response to other input data.

The present invention mainly aims to solve such a problem described above. That is, the present invention mainly aims to obtain a configuration capable of detecting an abnormality in the determination target device, even if the pair of the input data and the output data for the determination target device is not prepared in advance.

Solution to Problem

A data processing device includes:

a communication data receiving unit to receive communication data that a data communication device including a first data transmission unit and a second data transmission unit being different from the first data transmission unit transmits from the first data transmission unit;

a retransmission request message generation unit to generate a retransmission request message that requests the data communication device to retransmit the communication data from the second data transmission unit;

a retransmission request message transmission unit to transmit the retransmission request message generated by the retransmission request message generation unit to the data communication device; and a retransmission data receiving unit to receive retransmission data that the data communication device retransmits from the second data transmission unit in response to the retransmission request message.

Advantageous Effects of Invention

According to the present invention, an abnormality in a data communication device can be detected by comparing communication data transmitted from a first data transmission unit with retransmission data retransmitted by a second data transmission unit, even if the pair of the input data and the output data are not prepared in advance.

BRIEF DESCRIPTION OF DRAWINGS

[FIG. 5] a flowchart illustrating an example of operation of the data generation device according to the first embodiment;

[FIG. 6] a flowchart illustrating an example of operation of the monitoring device according to the first embodiment; and

[FIG. 7] a diagram illustrating an example of a hardware configuration of the data generation device and the monitoring device according to the first embodiment.

DESCRIPTION OF EMBODIMENTS

Embodiment 1

Figure 1:
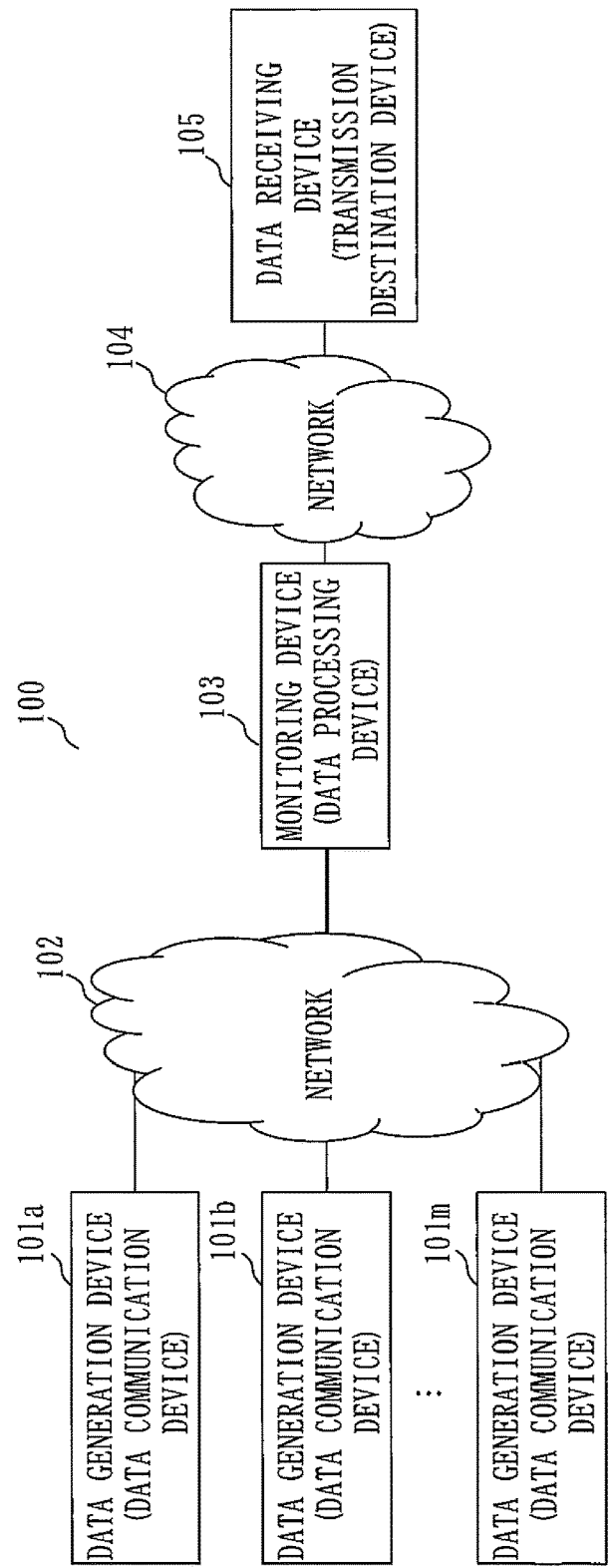
[FIG. 1] a diagram illustrating an example of a configuration of a communication system according to a first embodiment.

FIG. 1 illustrates an example of a configuration of a communication system 100 according to the present embodiment.

The communication system 100 according to the present embodiment includes a data generation device 101 (101a through 101m), a monitoring device 103, and a data receiving device 105.

The data generation device 101 and the monitoring device 103 are connected via a network 102.

The monitoring device 103 and the data receiving device 105 are connected via a network 104.

The data generation device 101 transmits communication data whose destination is the data receiving device 105.

The monitoring device 103 is arranged on a communication channel through which the communication data invariably passes when the data generation device 101 transmits the communication data to the data receiving device 105. The monitoring device 103 receives the communication data transmitted from the data generation device 101 to the data receiving device 105.

Then, the monitoring device 103 requests the data generation device 101 to retransmit the communication data.

The data generation device 101 retransmits the communication data according to the request from the monitoring device 103.

The monitoring device 103 receives the communication data (referred to as retransmission data) retransmitted from the data generation device 101, and compares the communication data with the retransmission data. If the communication data and the retransmission data are identical, the monitoring device 103 transfers the communication data to the data receiving device 105.

On the other hand, if the communication data and the retransmission data are not identical, the monitoring device 103 concludes that there is an abnormality occurring in the data generation device 101.

The data generation device 101 corresponds to an example of a data communication device, the monitoring device 103 corresponds to an example of a data processing device, and the data receiving device 105 corresponds to an example of a transmission destination device.

Figure 2:
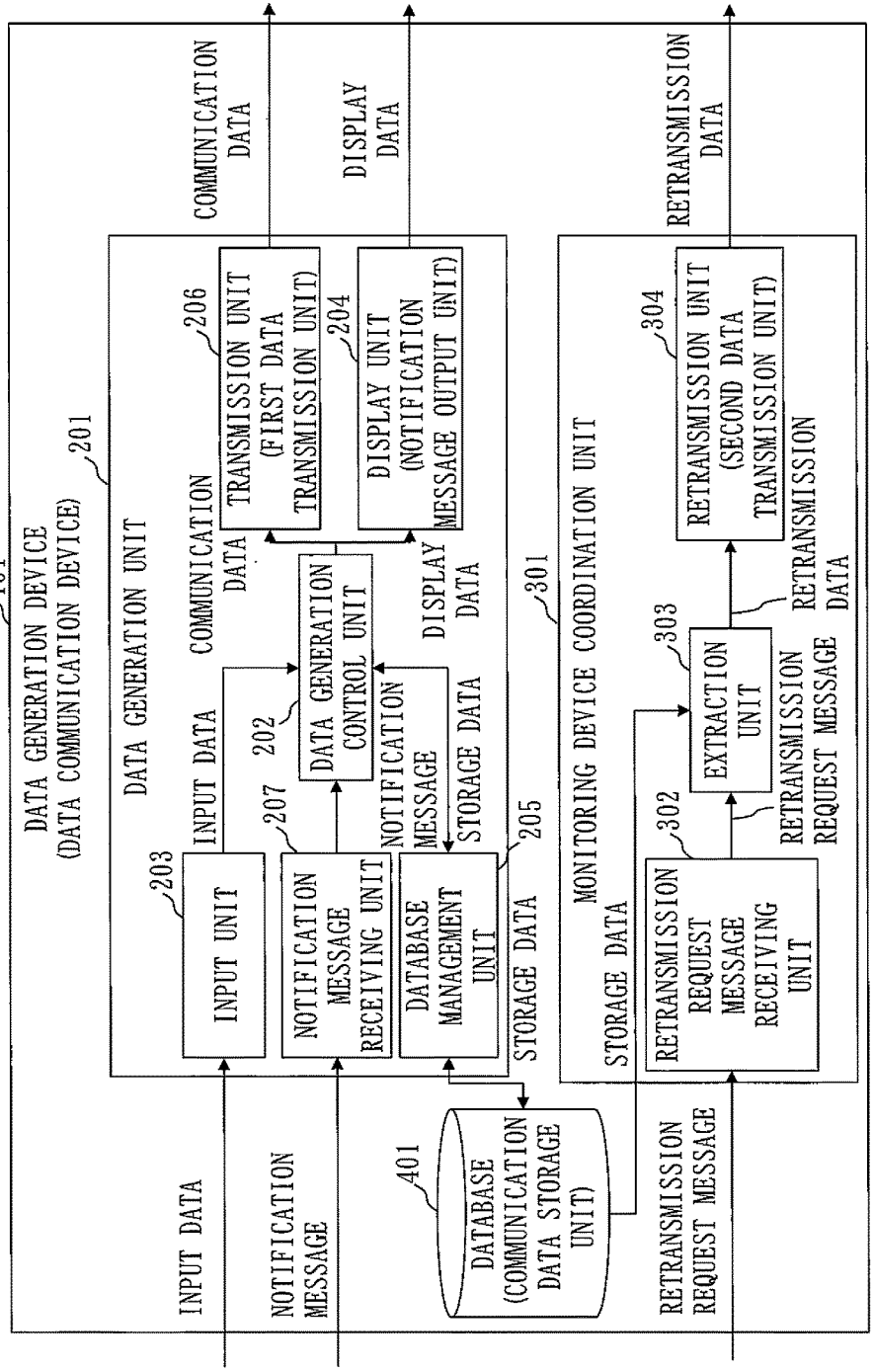
[FIG. 2] a diagram illustrating an example of a configuration of a data generation device according to the first embodiment.

FIG. 2 illustrates an example of a configuration of the data generation device 101 (101a through 101m).

The data generation device 101 includes a data generation unit 201, a monitoring device coordination unit 301, and a database 401.

The data generation unit 201 generates the communication data destined for the data receiving device 105, and transmits the communication data generated.

In the data generation unit 201, a data generation control unit 202 performs control related to generation of the communication data and transmission of the communication data.

An input unit 203 receives input data from a user generated using a keyboard and the like and outputs the input data to the data generation control unit 202.

A display unit 204 receives display data from the data generation control unit 202, displays the display data on a display, and notifies the user of generation status and error status of the communication data.

The display unit 204 corresponds to an example of a notification message output unit.

A database management unit 205 receives the input data (including both complete data and incomplete data) from the data generation control unit 202 as storage data, stores the storage data in the database 401, and further, reads out the storage data stored in the database 401.

A transmission unit 206 receives the communication data from the data generation control unit 202, executes a first communication program, and transmits the communication data to the network 102.

The transmission unit 206 corresponds to an example of a first data transmission unit.

A notification message receiving unit 207 receives a notification message transmitted from the monitoring device 103 and outputs the notification message to the data generation control unit 202.

The monitoring device coordination unit 301 operates in conjunction with the monitoring device 103.

In the monitoring device coordination unit 301, a retransmission request message receiving unit 302 receives a retransmission request message transmitted from the monitoring device 103.

An extraction unit 303 receives the retransmission request message from the retransmission request message receiving unit 302 and extracts the storage data from the database 401 based on the retransmission request message.

The storage data that the extraction unit 303 extracts is the same data as the communication data the transmission unit 206 has transmitted.

A retransmission unit 304 receives the storage data from the extraction unit 303, and transmits the storage data to the monitoring device 103 as the retransmission data.

The retransmission unit 304 executes a second communication program being different from the first communication program that the transmission unit 206 executes, and transmits the retransmission data.

The retransmission unit 304 corresponds to an example of a second data transmission unit.

The database 401 retains the storage data transmitted from the database management unit 205.

The database 401 reads out the storage data requested by the database management unit 205 or the extraction unit 303 and outputs the storage data to a request source.

The database 401 corresponds to an example of a communication data storage unit.

Figure 3:
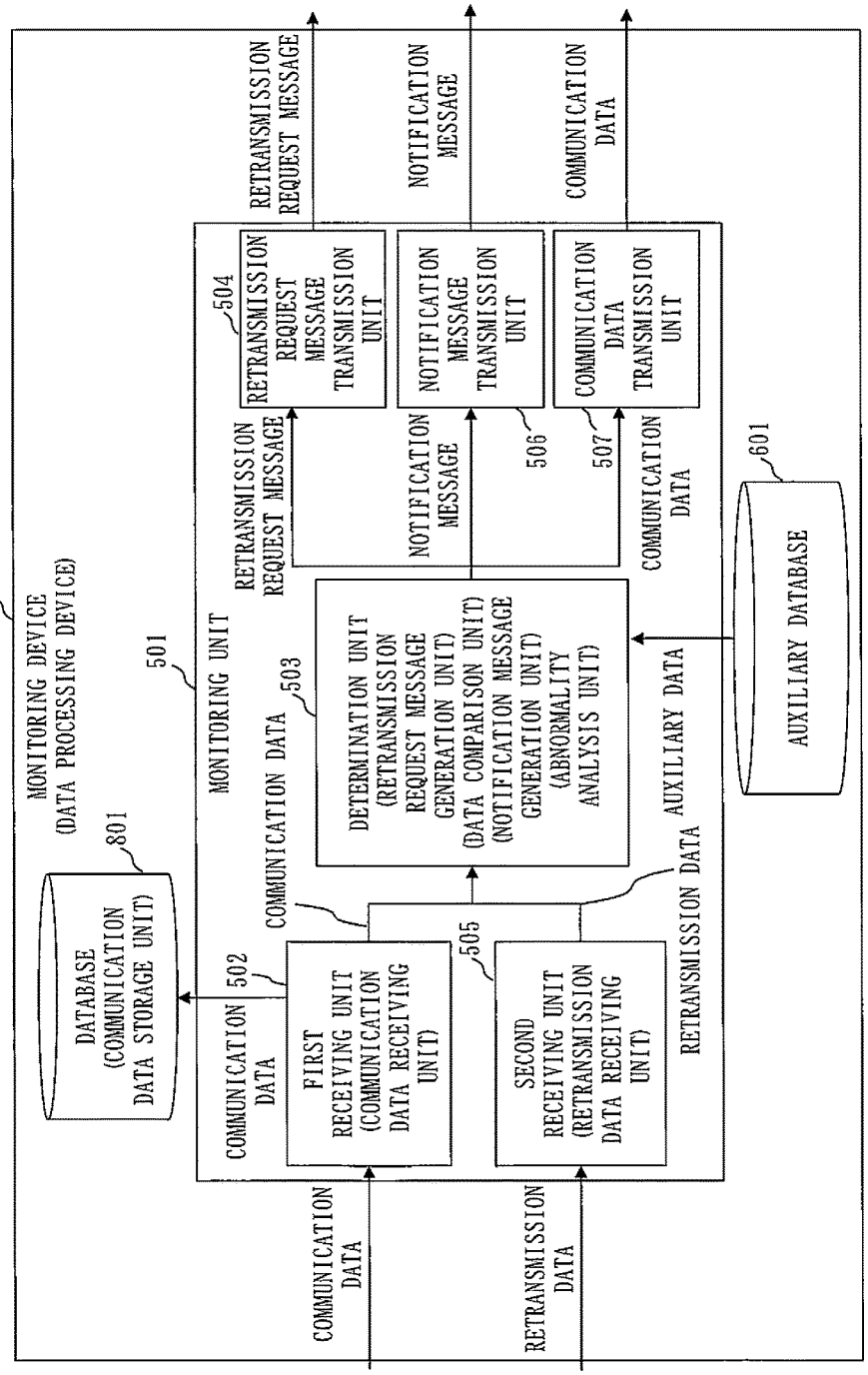
[FIG. 3] a diagram illustrating an example of a configuration of a monitoring device according to the first embodiment.

FIG. 3 illustrates an example of a configuration of the monitoring device 103.

The monitoring device 103 includes a monitoring unit 501, an auxiliary database 601, and a database 801.

The monitoring unit 501 monitors whether or not the communication data to be transmitted from the data generation unit 201 of the data generation device 101 to the data receiving device 105 is rewritten due to an abnormality of the data generation device 101 without the user noticing.

In the monitoring unit 501, a first receiving unit 502 receives the communication data transmitted from the data generation unit 201 of the data generation device 101.

The first receiving unit 502 stores the communication data in the database 801, and outputs a copy of the communication data to a determination unit 503.

The first receiving unit 502 corresponds to an example of a communication data receiving unit.

The determination unit 503 receives the copy of the communication data from the first receiving unit 502, analyzes whether or not an abnormality has occurred in the communication data. If an abnormality has not occurred in the communication data, the determination unit 503 generates a retransmission request message, and outputs the retransmission request message generated to a retransmission request message transmission unit 504.

If an abnormality has occurred in the communication data, the determination unit 503 generates a notification message which notifies that an abnormality has occurred in the communication data, and outputs the notification message generated to a notification message transmission unit 506.

The determination unit 503 receives the retransmission data from the data generation device 101 from a second receiving unit 505 and compares the communication data stored in the database 801 with the retransmission data received from the second receiving unit 505.

Then, as a result of the comparing the communication data with the retransmission data, if the communication data and the retransmission data are not identical, the determination unit 503 generates a notification message which notifies that the communication data and the retransmission data are not identical, and outputs the notification message generated to the notification message transmission unit 506.

On the other hand, if the communication data and the retransmission data are identical, the determination unit 503 outputs the communication data to a communication data transmission unit 507.

The determination unit 503 corresponds to an example of a retransmission request message generation unit, a data comparison unit, a notification message generation unit, and an abnormality analysis unit.

The retransmission request message transmission unit 504 transmits the retransmission request message generated in the determination unit 503 to the data generation device 101.

The second receiving unit 505 receives the retransmission data transmitted from the monitoring device coordination unit 301 of the data generation device 101.

The second receiving unit 505 corresponds to an example of a retransmission data receiving unit.

The notification message transmission unit 506 transmits the notification message generated in the determination unit 503 to the data generation device 101.

The communication data transmission unit 507 transmits the communication data to the data receiving device 105.

The auxiliary database 601 stores auxiliary data which supplements an abnormality determination of the communication data, or a determination of whether the communication data and the retransmission data are identical or not.

The auxiliary database 601 outputs the auxiliary data to the determination unit 503 when there is a request from the determination unit 503.

For example, the communication data that has been transmitted from the data generation device 101 in the past, a sample of an illegal code, an ideal pair of the input data and output data (also used in existing technology), and the like are retained in the auxiliary database 601.

The auxiliary database 601 is an auxiliary device for improving a determination ability and determination efficiency of the monitoring unit 501. Therefore, the auxiliary database 601 is not necessarily required, the auxiliary database 601 does not have to be used, and the auxiliary database 601 does not have to exist.

The database 801 stores the communication data the first receiving unit 502 received.

The database 801 corresponds to an example of a communication data storage unit.

Figure 4:
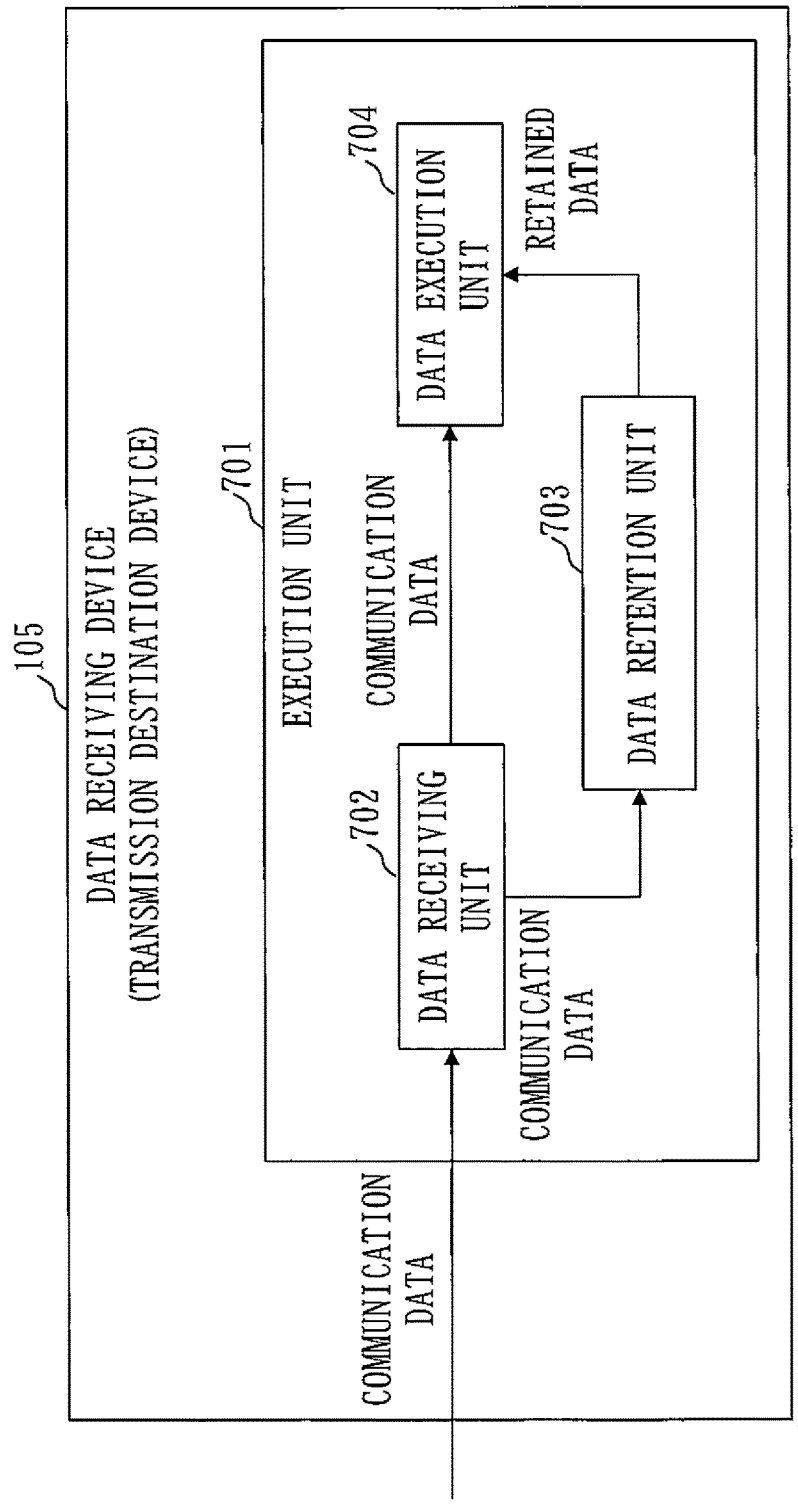
[FIG. 4] a diagram illustrating an example of a configuration of a data receiving device according to the first embodiment.

FIG. 4 illustrates an example of a configuration of the data receiving device 105.

The data receiving device 105 includes an execution unit 701.

The execution unit 701 retains the communication data transmitted from the monitoring device 103 (i.e. the communication data transmitted from the data generation device 101), and executes processing based on the communication data.

In the execution unit 701, a data receiving unit 702 receives the communication data transmitted from the monitoring unit 501 of the monitoring device 103.

A data retention unit 703 retains the communication data the data receiving unit 702 received.

A data execution unit 704 executes processing on the communication data.

Next, a method to detect whether or not an abnormality has occurred in the data generation device 101 will be disclosed.

In the following, operation of the data generation device 101 will be described by referring to FIG. 5, and operation of the monitoring device 103 will be described by referring to FIG. 6.

First, a user using the data generation device 101 generates input data destined for the data receiving device 105 using a keyboard and the like connected to the data generation device 101, the input unit 203 receives the input data, and the data generation control unit 202 stores the input data as storage data in the database 401 (S501 of FIG. 5).

Next, the data generation control unit 202 reads out the storage data from the database 401 and outputs the storage data read out as communication data to the transmission unit 206. The transmission unit 206 transmits the communication data to the network 102 designating the data receiving device 105 as a destination (S502).

As described above, the transmission unit 206 executes the first communication program to transmit the communication data.

Next, in the monitoring device 103, the first receiving unit 502 receives the communication data from the data generation device 101 (S601 of FIG. 6).

Next, the first receiving unit 502 stores the communication data in the database 801 (S602) and outputs a copy of the communication data to the determination unit 503.

Next, the determination unit 503 receives the copy of the communication data and analyzes the copy of the communication data (S603).

For example, the determination unit 503 performs the abnormality determination of the communication data by using the auxiliary data retained in the auxiliary database 601.

If an abnormality has occurred in the communication data (YES at S604), the determination unit 503 generates a notification message which notifies that an abnormality has occurred in the communication data (S611).

Then, the determination unit 503 outputs the notification message to the notification message transmission unit 506.

The notification message transmission unit 506 transmits the notification message to the data generation device 101 (S612).

In the analyses at S603 and S604, the determination unit 503 may analyze whether or not there is an abnormality in the communication data by using a static analysis tool.

The determination unit 503 may analyze whether or not there is an abnormality in the communication data by implementing a simulation using a simulator related to the data receiving device 105.

The determination unit 503 may display the communication data on a display connected to the monitoring device 103 and a person (including the user who generated the communication data) may analyze the communication data on the display to check whether or not there is an abnormality.

If the auxiliary database 601 is not included in the monitoring device 103, S603 and S604 may be omitted, and the determination unit 503 may perform the processing of S605.

If the notification message is transmitted from the monitoring device 103, the notification message receiving unit 207 of the data generation device 101 receives the notification message (YES at S503 of FIG. 5).

Then, the display unit 204 displays contents of the notification message (S507) to notify the user of the abnormality in the communication data.

On the other hand, if an abnormality has not occurred in the communication data at S604 of FIG. 6 (NO at S604), the determination unit 503 of the monitoring device 103 generates a retransmission request message (S605) and outputs the retransmission request message to the retransmission request message transmission unit 504.

The retransmission request message is a message that requests the data generation device 101 to have the retransmission unit 304 execute the second communication program and retransmit the communication data.

The retransmission request message transmission unit 504 transmits the retransmission request message to the data generation device 101 via the network 102 (S606).

If the retransmission request message is transmitted from the monitoring device 103, the retransmission request message receiving unit 302 of the data generation device 101 receives the retransmission request message (YES at S504 of FIG. 5).

The retransmission request message receiving unit 302 outputs the retransmission request message to the extraction unit 303.

The extraction unit 303 reads out the storage data the transmission unit 206 transmitted as the communication data from the database 401 and outputs the storage data read out as retransmission data to the retransmission unit 304, based on the retransmission request message.

The retransmission unit 304 transmits the retransmission data from the extraction unit 303 to the monitoring device 103 via the network 102 (S505).

As described above, the retransmission unit 304 transmits the communication data by executing the second communication program.

In the monitoring device 103, the second receiving unit 505 receives the retransmission data transmitted from the data generation device 101 (S607 of FIG. 6).

The second receiving unit 505 outputs the retransmission data to the determination unit 503.

The determination unit 503 reads out the communication data from the database 801, compares the retransmission data from the second receiving unit 505 with the communication data from the database 801, and determines whether or not the communication data and the retransmission data are identical (S608).

If the communication data and the retransmission data are not identical (NO at S609), the determination unit 503 generates the notification message which notifies that the communication data and the retransmission data are not identical (S611).

Then, the determination unit 503 outputs the notification message to the notification message transmission unit 506.

The notification message transmission unit 506 transmits the notification message to the data generation device 101 (S612).

In this case as well, in the data generation device 101, the display unit 204 displays the contents of the notification message (S507) and notifies the user that the communication data and the retransmission data are not identical.

On the other hand, if the communication data and the retransmission data are identical (YES at S609), the determination unit 503 outputs the communication data to the communication data transmission unit 507.

The determination unit 503 may retain the communication data in the auxiliary database 601 in parallel so as to improve efficiency of the abnormality determination of the communication data (S603) to be implemented in the future.

The communication data transmission unit 507 transmits the communication data to the data receiving device 105 via the network 104 (S610).

In the analyses at S608 and S609, the determination unit 503 may be made to compare the communication data with the retransmission data using the static analysis tool and check the difference between the communication data and the retransmission data.

The determination unit 503 may compare the communication data with the retransmission data by implementing the simulation using the simulator related to the data receiving device 105.

The determination unit 503 may compare binary data of the communication data with binary data of the retransmission data and determine whether or not they are identical.

The determination unit 503 may display the communication data and the retransmission data on the display connected to the monitoring device 103 and a person (including the user who generated the communication data) may analyze the communication data and the retransmission data on the display to check whether or not they are identical.

Here, if the determination is made using the binary data, information not directly related to data contents, such as transmission time, may be included in the communication data and the retransmission data. Therefore, the determination of whether or not they are identical may be made using the binary data without those unrelated parts.

The unrelated parts may be removed based on the auxiliary data retained in the auxiliary database, at the time of making a comparison.

In the data receiving device 105, the data receiving unit 702 of the execution unit 701 receives the communication data transmitted from the data generation device 101 (actually the monitoring device 103).

Then, the data retention unit 703 retains the communication data.

The data execution unit 704 executes processing on the communication data or reads out retained data retained in the data retention unit 703 and executes processing on the retained data, depending on a situation.

An abnormality in the data generation device 101 can be detected according to the procedure above.

For example, it is highly likely that the communication data and the retransmission data are not identical when there is an abnormality in the first communication program which the transmission unit 206 of the data generation device 101 executes, while the second communication program the retransmission unit 304 executes remains normal.

In other words, there is a possibility that the storage data stored in the database 401 is rewritten and transmitted as the communication data from the transmission unit 206, because of the abnormality in the first communication program.

Since the second communication program is normal, the storage data stored in the database 401 is transmitted from the retransmission unit 304 unchanged as retransmission data.

Therefore, an abnormality in the data generation device 101 can be detected by extracting a difference between the communication data and the retransmission data in the monitoring device 103.

According to the present embodiment, the monitoring device 103 can detect an abnormality in software in the data generation device 101. Additionally, the monitoring device 103 can detect an abnormality in the data generation device 101 even when the communication data is rewritten by an abnormality in hardware (for example, hardware used for communication) of the data generation device 101.

As described, according to the present embodiment, an abnormality in the data generation device 101 can be detected without preparing a pair of input data and output data in advance as in Patent Literature 1.

If an ideal pair of the input data and the output data is prepared in the auxiliary database 601 in the monitoring device 103, it is possible to improve accuracy of abnormality detection because a method as in Patent Literature 1 can be executed.

As described above, there is a possibility that the communication data is rewritten and transmitted due to the abnormality in the data generation device 101, without the user noticing.

If the monitoring device 103 according to the present embodiment is not arranged, the communication data after being rewritten is delivered to the data receiving device 105, and thus processing is executed based on the communication data rewritten in the data receiving device 105.

Therefore, there is a risk of the data receiving device 105 breaking down depending on rewritten contents.

With the monitoring device according to the present embodiment, if the monitoring device 103 detects an abnormality in the data generation device 101, a breakdown of the data receiving device 105 can be avoided because the communication data does not reach the data receiving device 105.

Finally, an example of a hardware configuration of the data generation device 101 and the monitoring device 103 described in the present embodiment will be described by referring to FIG. 7.

The data generation device 101 and the monitoring device 103 are computers and can realize each element of the data generation device 101 and the monitoring device 103 by programs.

As the hardware configuration of the data generation device 101 and the monitoring device 103, a computing device 901, an external storage device 902, a main storage device 903, a communication device 904, and an input output device 905 are connected to a bus.

The computing device 901 is a CPU (Central Processing Unit) that executes programs.

The external storage device 902 is, for example, a ROM (Read Only Memory), a flash memory, or a hard disk device.

The main storage device 903 is a RAM (Random Access Memory).

The communication device 904 corresponds to a physical layer of the transmission unit 206, the notification message receiving unit 207, the retransmission request message receiving unit 302, the retransmission unit 304, the first receiving unit 502, the second receiving unit 505, the retransmission request message transmission unit 504, the notification message transmission unit 506, and the communication data transmission unit 507.

The input output device 905 is, for example, a mouse, a keyboard, a display device, and the like.

The programs are usually stored in the external storage device 902. The programs as loaded in the main storage device 903 are read into the computing device 901 sequentially and executed by the computing device 901.

The programs are those that realize functions each described as " . . . unit" illustrated in FIG. 1.

Furthermore, an operating system (OS) is also stored in the external storage device 902. At least a part of the OS is loaded into the main storage device 903, and the computing device 901 executes the programs each of which realizes the function of " . . . unit" illustrated in FIG. 1 while executing the OS.

The information, data, signal values, and variable values representing the results of processing that are explained as "conclusion of . . . ", "determination of . . . ", "extraction of . . . ", "detection of . . . ", "analysis of . . . ", "generation of . . . ", "receiving of . . . ", "outputting of . . . ", and the like, in the description of the present embodiment are stored in the main storage device 903 as a file.

An encryption key/decryption key, random values, and parameters may be stored in the main storage device 903 as a file.

The configuration of FIG. 7 illustrates only an example of the hardware configuration of the data generation device 101 and the monitoring device 103. The hardware configuration of the data generation device 101 and the monitoring device 103 may have another configuration, not limited to the configuration illustrated in FIG. 7.

The data receiving device 105 described in the present embodiment may have the hardware configuration of FIG. 7 or may have another hardware configuration.

It is possible to realize the data processing method and the data communication method according to the present invention by the procedure described in the present embodiment.

REFERENCE SIGNS LIST

100: communication system, 101: data generation device, 102: network; 103: monitoring device, 104: network, 105: data receiving device, 201: data generation unit, 202: data generation control unit, 203: input unit, 204: display unit, 205: database management unit, 206: transmission unit, 207: notification message receiving unit, 301: monitoring device coordination unit, 302: retransmission request message receiving unit, 303: extraction unit, 304: retransmission unit, 401: database, 501: monitoring unit, 502: first receiving unit, 503: determination unit, 504: retransmission request message transmission unit, 505: second receiving unit, 506: notification message transmission unit, 507: communication data transmission unit, 601: auxiliary database, 701: execution unit, 702: data receiving unit, 703: data retention unit, 704: data execution unit, 801: database

The invention claimed is:

1. A data processing device comprising:
    processing circuitry
    to receive communication data transmitted by a data communication device programmed to selectively execute a first communication program and a second communication program, the first and second communication programs being different from one another, the received communication data being transmitted by the data communication device by executing the first communication program;
    to check whether there is an abnormality in one of the first communication program and the second communication program by:
        generating a retransmission request message that requests the data communication device to retransmit the communication data by executing the second communication program,
        transmitting the retransmission request message generated to the data communication device,
        receiving retransmission data that the data communication device retransmits by executing the second communication program in response to the retransmission request message, and
        comparing the received communication data with the received retransmission data, said abnormality being detected when the received communication data is not identical with the retransmission data; and
    to automatically alert a user that the first communication program or the second communication program is operating abnormally when the abnormality is detected.

2. The data processing device according to claim 1, wherein
    the processing circuitry further
    stores the communication data received, and
    compares the retransmission data received with the communication data stored.

3. The data processing device according to claim 2, wherein
    the processing circuitry
    generates a notification message which notifies the data communication device that the retransmission data and the communication data are not identical when it is determined that the retransmission data and the communication data are not identical as a result of comparing the retransmission data with the communication data, and
    transmits the notification message generated to the data communication device.

4. The data processing device according to claim 2, wherein
    the processing circuitry
    receives the communication data that the data communication device transmits designating a specific transmission destination device as a transmission destination, and
    transmits the communication data to the transmission destination device when it is determined that the retransmission data and the communication data are identical as a result of comparing the retransmission data with the communication data.

5. The data processing device according to claim 1, wherein
    the processing circuitry
    performs an initial analysis of whether or not the abnormality has occurred in the communication data prior to generating the retransmission message, and
    generates the retransmission request message when the initial analysis does not determine that the abnormality has occurred in the communication data.

6. The data processing device of claim 5, wherein
    the processing circuitry further
    generates a notification message which notifies that the abnormality has occurred in the communication data when it is determined that the abnormality has occurred in the communication data, and
    transmits the notification message generated to the data communication device.

7. A data communication device comprising:
    a communication data storage circuit to store communication data;
    a computer processor; and
    a memory storing instructions which, when executed by the computer processor, performs the following process:
        executing a first communication program to transmit the communication data;
        receiving a retransmission request message that requests retransmission of the communication data from a data processing device that has received the communication data transmitted by execution of the first communication program; and
        executing a second communication program, in place of the first communication program, to retransmit the communication data stored in the communication data storage circuit to the data processing device when the retransmission request message is received by the retransmission request message receiver,
    wherein the transmitted communication data is compared with the retransmitted communication data as part of a process to check for an abnormality in one of the first communication program and the second communication program, said abnormality being detected when the transmitted communication data is not identical with the retransmitted communication data, and
    wherein, when the abnormality is detected, an alert is automatically generated and provided to a user indicating that the first communication program or the second communication program is operating abnormally.

8. The data communication device according to claim 7, the process further comprising:
    receiving, from the data processing device, a notification message which notifies that the communication data and retransmission data are not identical as a result of comparing the communication data transmitted by the first data transmitter with the retransmission data retransmitted by the second data transmitter; and
    outputting the notification message received by the notification message receiver.

9. A communication system comprising:
    the data processing device and the data communication device according to claim 1, wherein
    the data communication device includes:
        a communication data storage circuit to store communication data;

a computer processor; and a memory storing instructions which, when executed by the computer processor, performs the following process:

executing a first communication program to transmit the communication data;

receiving a retransmission request message that requests retransmission of the communication data from a data processing device that has received the communication data transmitted by execution of the first communication program; and executing a second communication program, in place of the first communication program, to retransmit the communication data stored in the communication data storage circuit to the data processing device when the retransmission request message is received by the retransmission request message receiver.

10. A data processing method comprising:

receiving communication data transmitted by a data communication device programmed to selectively execute a first communication program and a second communication program, the first and second communication programs being different from one another, the received communication data being transmitted by the data communication device by executing the first communication program; and check whether there is an abnormality in one of the first communication program and the second communication program by:

generating a retransmission request message to request the data communication device to retransmit the communication data by executing the second communication program;

transmitting the retransmission request message generated to the data communication device, receiving retransmission data that the data communication device retransmits from the second data transmitter in response to the retransmission request message, and comparing the received communication data with the received retransmission data, said abnormality being detected when the received communication data is not identical with the retransmission data.

11. A data communication method comprising:

storing communication data;

transmitting the communication data by executing a first communication program;

receiving a retransmission request message that requests retransmission of the communication data from a data processing device that has received the communication data; and retransmitting the communication data stored to the data processing device by executing a second communication program being different from the first communication program, wherein the transmitted communication data is compared with the retransmitted communication data as part of a process to check for an abnormality in one of the first communication program and the second communication program, said abnormality being detected when the received communication data is not identical with the retransmission data, and wherein, when the abnormality is detected, an alert is automatically generated and provided to a user indicating that the first communication program or the second communication program is operating abnormally.

12. A non-transitory computer readable medium on which is stored a program which, when executed, causes a computer to function as the data processing device according to claim 1.

13. A non-transitory computer readable medium on which is stored a program which, when executed, causes a computer to function as the data communication device according to claim 7.

* * * * *